US011443728B2

(12) United States Patent
Hustava et al.

(10) Patent No.: US 11,443,728 B2
(45) Date of Patent: Sep. 13, 2022

(54) ECHO DETECTION WITH BACKGROUND NOISE BASED SCREENING (71) Applicant: SEMICONDUCTOR COMPONENTS INDUSTRIES, LLC, Phoenix, AZ (US)

(72) Inventors: Marek Hustava, Bratislava (SK); Pavel Kostelnik, Bordovice (CZ); Dalibor Bartos, Troubsko (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/532,375

(22) Filed: Nov. 22, 2021

(65) Prior Publication Data

US 2022/0199067 A1 Jun. 23, 2022

Related U.S. Application Data (60) Provisional application No. 63/127,599, filed on Dec. 18, 2020.

(51) Int. Cl.
*G10K 11/178* (2006.01)
(52) U.S. Cl.
CPC .. *G10K 11/17837* (2018.01); *G10K 11/17823* (2018.01); *G10K 11/17825* (2018.01); *G10K 11/17833* (2018.01); *G10K 2210/505* (2013.01)
(58) Field of Classification Search
CPC ....... G10K 11/17837; G10K 11/17823; G10K 11/17825; G10K 2210/505; G10K 11/17833
(Continued)

(56) References Cited

U.S. PATENT DOCUMENTS 5,793,326 A 8/1998 Hofele
5,793,704 A 8/1998 Freger
(Continued)

FOREIGN PATENT DOCUMENTS

DE 102013226085 B3 3/2015
DE 102017103275 A1 8/2018
(Continued)

OTHER PUBLICATIONS

Marek HUSTAVA et al., "Detection of Noise-Induced Ultrasonic Sensor Blindness," U.S. Appl. No. 16/254,882, filed Jan. 23, 2019, 29 pages.

*Primary Examiner* — Vivian C Chin
*Assistant Examiner* — Douglas J Suthers
(74) *Attorney, Agent, or Firm* — Ramey LLP (57) ABSTRACT

An illustrative controller includes: a transmitter to drive the acoustic transducer to generate acoustic bursts; a receiver to sense a response of the acoustic transducer to echoes; and a processing circuit coupled to the transmitter and to the receiver, the processing circuit configured to convert said received response into output data by: correlating said response to a driving signal to obtain a correlation response; distinguishing peak areas from non-peak areas in said correlation response; deriving a noise level in a portion of said correlation response based on the non-peak areas within said portion; calculating a signal to noise ratio (SNR) for a peak signal within the portion as a ratio of a peak value for the peak signal to the noise level in said portion of said correlation response; and accepting the peak signal as an echo only if the SNR for said peak signal exceeds a predetermined threshold.

20 Claims, 4 Drawing Sheets

(58) Field of Classification Search
USPC .......................................................... 381/71.6
See application file for complete search history.

(56) References Cited

U.S. PATENT DOCUMENTS

| | | |
|---|---|---|
| 10,234,549 B2 | 3/2019 | Suchy et al. |
| 10,345,445 B2 | 7/2019 | Hustava et al. |
| 11,163,048 B2 | 11/2021 | Suchy et al. |
| 2018/0031701 A1* | 2/2018 | Hustava .................. G01S 15/87 |
| 2018/0160226 A1* | 6/2018 | Hustava .................. G01S 7/523 |
| 2019/0018126 A1* | 1/2019 | Kluge .................... G01S 7/2813 |
| 2019/0025415 A1* | 1/2019 | Suchy ....................... G01S 7/53 |
| 2019/0079173 A1 | 3/2019 | Kutej et al. |
| 2019/0079174 A1 | 3/2019 | Kutej et al. |
| 2020/0200898 A1 | 6/2020 | Hustava et al. |
| 2020/0271767 A1 | 8/2020 | Hustava et al. |

FOREIGN PATENT DOCUMENTS

| | | |
|---|---|---|
| FR | 3036809 | 12/2016 |
| WO | 2009108786 A1 | 9/2009 |

* cited by examiner

ECHO DETECTION WITH BACKGROUND NOISE BASED SCREENING

CROSS-REFERENCE TO RELATED APPLICATIONS

The present application claims priority to provisional U.S. application 63/127,599, filed 2020 Dec. 18 and titled "Ultrasonic Sensor System" by inventors M. Hustava, P. Kostelnik, and D. Bartos. The present application further relates to U.S. application Ser. No. 16/530,654, filed 2019 Aug. 2 and titled "Ultrasonic Sensor Having Edge-Based Echo Detection" by inventors M. Hustava and J. Kantor. Both of the foregoing applications are hereby incorporated herein by reference.

BACKGROUND

Modern automobiles are equipped with an impressive number and variety of sensors. For example, cars are now routinely equipped with arrays of ultrasonic sensors to monitor distances between the car and any nearby persons, pets, vehicles, or obstacles. Due to environmental "noise" and safety concerns, each of the sensors may be asked to provide tens of measurements each second while the car is in motion. It is important for such sensor arrays to perform reliably, even in environments that change in complex ways. Seemingly small differences, such as the presence or absence of a curb, or even the difference between paved and gravel surfaces, can significantly change the characteristic reflection of a pole, bollard, or other slim obstacle.

The noise encountered by park-assist sensors is known to have different origins, and includes for instance pneumatic noise such as vibrations originating from other vehicles operating nearby; ultrasound from other sources such as sensors on other cars, parking lot occupation detectors, and traffic light control systems; cross-correlation noise between different frequency bands; and so on. There is therefore a need for adequate handling of such noise in the detection and evaluation of any received ultrasound signals.

SUMMARY

Accordingly, there are disclosed controllers for acoustic transducers, park assist control systems, and methods providing echo detection with background noise based screening. One illustrative controller includes: a transmitter to drive the acoustic transducer with a driving signal to generate acoustic bursts; a receiver to sense a response of the acoustic transducer to echoes of each acoustic burst; and a processing circuit coupled to the transmitter and to the receiver, the processing circuit configured to convert said received response into output data by: correlating said response to said driving signal to obtain a correlated magnitude signal; distinguishing peak areas from non-peak areas in said correlated magnitude signal; deriving a noise level in a portion of said correlated magnitude signal based on the correlated magnitude signal in non-peak areas within said portion; calculating a signal to noise ratio (SNR) for a peak signal within the portion as a ratio of a peak value for the peak signal to the noise level in said portion of said correlated magnitude signal; and accepting the peak signal as an echo only if the SNR for said peak signal exceeds a predetermined threshold.

An illustrative park assist control system includes a microcontroller, at least one a controller for an acoustic transducer, and a communication bus coupling the microcontroller and said at least one controller. The controller includes: a transmitter to drive the acoustic transducer with a driving signal to generate acoustic bursts; a receiver to sense a response of the acoustic transducer to echoes of each acoustic burst; a processing circuit coupled to the receiver to convert said received response into output data; and an interface to convey said output data over the communication bus. At least one of the processing circuit and the microcontroller is configured to: correlate said response with a pulse pattern to obtain a correlated response; distinguish peak areas from non-peak areas in said correlated response; derive a noise level in a portion of said correlated response using only the non-peak areas within said portion; calculate a signal to noise ratio (SNR) for a peak signal within the portion as a ratio of a peak value for the peak signal to said the noise level; and accept the peak signal as an echo only if the SNR for said peak signal exceeds a predetermined threshold.

An illustrative method of operating a piezoelectric-based sensor includes: driving a piezoelectric transducer to generate a burst of acoustic energy; obtaining a response from the piezoelectric transducer; correlating said response relative to said driving signal to obtain a correlated response; distinguish peak areas from non-peak areas in said correlated response; deriving a noise level in a portion of said correlated response using only the non-peak areas within said portion; calculating a signal to noise ratio (SNR) for a peak signal within the portion as a ratio of a peak value of for the peak signal to the noise level; and accepting the peak signal as an echo only if the SNR for said peak signal exceeds a predetermined threshold.

Another illustrative controller for an acoustic transducer includes: a transmitter drive the acoustic transducer with a driving signal to generate acoustic bursts; a receiver to sense a response of the acoustic transducer to echoes of each acoustic burst; a processing circuit coupled to the transmitter and to the receiver, the processing circuit configured to convert said received response into output data by: correlating said response to said driving signal to obtain a correlated response; distinguishing peak areas from non-peak areas in said correlated response; using the non-peak areas in a portion of the correlated response to derive a noise level; calculating a signal to noise ratio (SNR) for a peak signal within the portion as a ratio of a peak value for the peak signal to the noise level; and identifying the peak signal as a ground reflection if the SNR falls below a predetermined threshold.

Each of the foregoing examples can be employed individually or in conjunction, and may include one or more of the following features in any suitable combination: 1. using the processing circuit or microcontroller to determine a derivative signal from the correlated magnitude signal, and to accept the peak signal as an echo only if the derivative signal corresponding to said peak signal exceeds a derivative threshold. 2. the derivative threshold is a CFAR threshold determined from a Continuous False Alarm Rate (CFAR) algorithm applied to the derivative signal. 3. a memory for storing the derivative threshold. 4. calculating a CFAR threshold using a Continuous False Alarm Rate (CFAR) algorithm, and comparing the correlated magnitude signal with said CFAR threshold to distinguish the peak areas from non-peak areas. 5. accepting the peak signal as an echo only if the peak signal is within one of said peak areas. 6. the processing circuit includes a peak measurement element to detect said peak value. 7. providing an output indicating a presence of a ground reflection. 8. the output indicative of ground reflections is based on the calculated SNR ratio.

DETAILED DESCRIPTION

It should be understood that the drawings and following description do not limit the disclosure, but on the contrary, they provide the foundation for one of ordinary skill in the art to understand all modifications, equivalents, and alternatives falling within the scope of the claim language.

Figure 1:
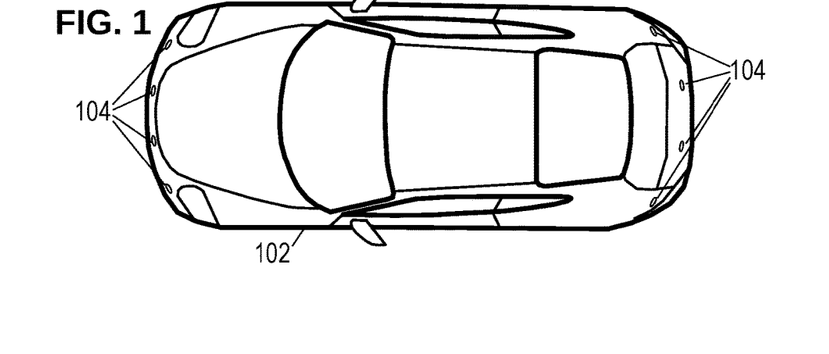
FIG. 1 is an overhead view of an illustrative vehicle equipped with parking-assist sensors.

As an illustrative usage context, FIG. 1 shows a vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors. Some contemplated sensor arrangements include 24 ultrasonic sensors arranged around the vehicle. The vehicle may employ the sensor arrangement for detecting and measuring distances to objects in the various detection zones, potentially using the sensors for individual measurements as well as cooperative (e.g., triangulation, multi-receiver) measurements.

The ultrasonic sensors are transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported through the use of orthogonal waveforms or transmissions to non-overlapping detection zones.

While the parking-assist system context is used as an example herein, the concepts of this disclosure may be applied to any type of obstacle monitoring, and may be particularly suitable for those that prioritizes reliability and rapid response. In order to mitigate any tradeoff between reliability and extended detection range, appropriate modulation can be added to the transmit pulse to resolve the disadvantages of increasing the length of the transmit pulse. Subsequently, a correlator may be used to shorten or compress the echo of a longer, modulated transmit pulse.

In various embodiments, use is made of chirp-modulated signals. A chirp is a transmit pulse that changes frequency during transmission. One form of modulation of the transmit pulse is, for instance, a linear frequency modulated ("LFM") chirp. An up-chirp is a chirp that increases in frequency during transmission, and a down-chirp is a chirp that decreases in frequency during transmission. For clarity, the examples used herein will consider a linear increase or decrease, however in various embodiments the increase or decrease is not linear. A variable-rate chirp increases and decreases in frequency at different rates during the pulse. A correlator can compress the echo of a chirp without introducing much or any correlation noise. As such, peak detection of the echo is facilitated without decreasing time resolution. Additionally, LFM chirps withstand Doppler frequency shift without, or with a minimum of, increase in correlation noise. LFM chirps can be used as transmit pulses for measuring a distance to an obstacle, or object, situated in front of a sensor system.

For sake of clarity, the term 'pulse' as used herein refers to a single driving signal in a series of driving signals. Such a chirp pulse may have a long duration in comparison to an amplitude modulated (AM) signal, for instance more than 1 millisecond, such as in the range of 2-3 milliseconds.

Figure 2:
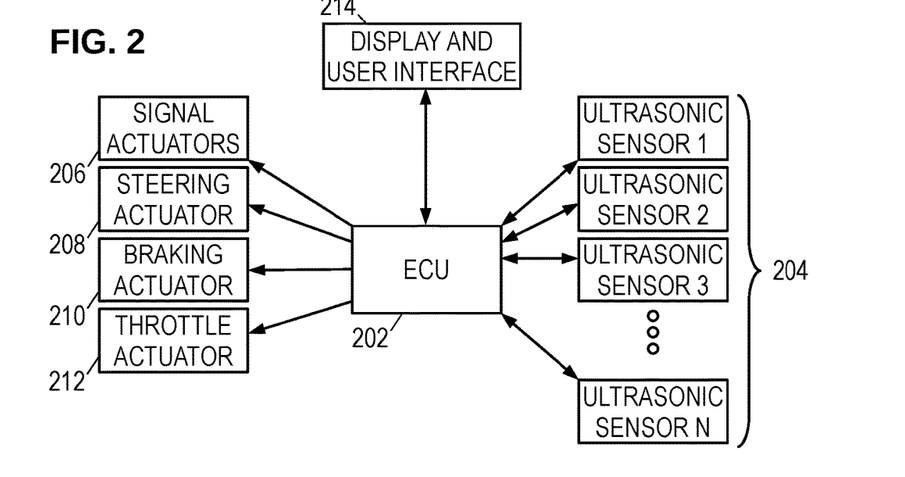
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

Figure 3:
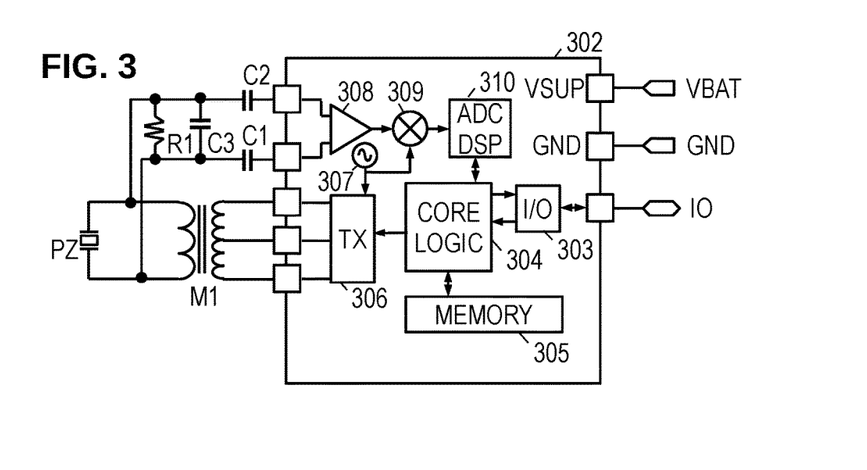
FIG. 3 is a circuit schematic of an illustrative parking-assist sensor.

One potential sensor configuration is now described with reference to FIG. 3, which shows a three-terminal configuration with two terminals for power and one terminal for I/Q Other communication and power supply techniques such as those provided in the DSI3, LIN, and CAN standards, would also be suitable and are contemplated for use in accordance with the principles disclosed herein. Besides the two power terminals (Vbat and GND) shown in the embodiment of FIG. 3, each of the illustrative ultrasonic sensors is only connected to the ECU 202 by a single input/output ("I/O" or "IO") line. The I/O line may be biased to the supply voltage (the "de-asserted" state) by a pull-up resistor when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which, with a suitably modulated local oscillator signal from a voltage controlled oscillator 307, drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that can be tuned with external components such as with a parallel capacitor C3, and has a resonance quality factor (Q) that can similarly tuned, e.g., with a parallel resistor R1.

As used herein, the term "piezoelectric transducer" includes not only the piezoelectric element, but also the supporting circuit elements for tuning, driving, and sensing, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements. In the illustrated embodiment, a pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting.

Commands received via the I/O line trigger the core logic 304 to operate the transmitter and receiver and to provide the measurement results to the ECU 202 via the I/O line, also referred herein as a communication bus. The measurement results are herein also referred to as output data. A preferred communication bus is the DSI3 bus, although other communication buses such as LIN, SENT, CAN are not excluded. The core logic 304 may monitor other sensor conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

As the received echo signals are typically in the millivolt or microvolt range, a front-end amplifier 308 amplifies the signal from the receive terminals. A mixer 309 multiplies the amplified receive signal with the local oscillator signal to down convert the modulated signal to baseband, which is then digitized by an analog-to-digital converter (ADC) and processed in a digital signal processor (DSP) 310. Alternatively, the receive signal can be digitized before downconversion, in which case the mixer 309 may be an in-phase/quadrature (I/O) digital mixer 303, giving Zero Intermediate Frequency (ZIF) IQ data as its output. (Though the term "ZIF" is used herein, the downconverted signal may in practice be a low intermediate frequency or "near-baseband" signal.)

DSP 310 applies programmable methods to monitor the piezoelectric transducer during the transmission of a burst, and to detect any echoes and measure their parameters such as time-of-flight (ToF), duration, and peak amplitude. Such methods may employ threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and quality factor, and may further detect transducer fault states.

In one embodiment the DSP comprises a digital filter that is configured to cooperate with a memory for storing finite impulse response (FIR) filter coefficients. As mentioned above, the mixer 309 is in one embodiment a quadrature mixer. This I/Q digital mixer 309 has an input connected to the output of analog-to-digital converter, an input for receiving a mixing signal FTX, and first and second outputs for providing an in-phase signal and a quadrature signal, respectively, that corresponds to an amplitude and a phase of the signal input from the acoustic transducer in the complex plane.

As mentioned above, the mixer 309 is in one implementation a quadrature mixer. This I/Q digital mixer 309 has an input connected to the output of an analog-to-digital converter (not shown), an input for receiving a mixing signal $F_{TX}$, and first and second outputs for providing an in-phase signal and a quadrature signal, respectively, that corresponds to an amplitude and a phase of the signal input from the acoustic transducer in the complex plane. The DSP may include one or more digital filters that are configured to retrieve and use filter coefficients stored in memory for operating on the ZIF-IQ signal. More particularly, the digital filters may include low-pass filters and correlators. Even more specifically, at least one correlation filter has coefficients that match the shape of the transmit pulse at baseband, such that the filter output exhibits a peak wherever an echo appears in the downconverted receive signal.

The DSP may further include programmable modules or dedicated circuitry for other operations, including phase derivation, magnitude measurement, down sampling, amplitude scaling (attenuation control), noise suppression, peak detection, reverberation monitoring, and transducer diagnostics, and an interface for host communications. A magnitude detector module or circuit operates on the digitized and downconverted receive signal, combining the in-phase and quadrature signal components to output a magnitude signal.

In operation of one illustrative implementation, if an object reflects the transmit pulse, the piezoelectric transducer supplies a receive signal that includes the echo of the chirp signal as the input signal at I/Q digital mixer 309. Once any residual reverberation from the transmit pulse is finished, a chirp echo signal can be detected for near range object detection. I/Q digital mixer 309 shifts the receive signal to sum and difference frequencies, in which the difference frequency is at baseband (zero frequency). I/Q digital mixer 309 outputs both an in-phase signal component and a quadrature phase signal component of the received signal. One or more correlators receive the in-phase and quadrature signal components and produce a correlation signal having a peak where the receive signal contains an echo of the transmit pulse. Two correlators may be used for dual-channel operation, with a high channel correlator for detecting high-channel chirps and a low channel correlator for detecting low-channel chirps.

In practice, the response as received and digitized does not merely include any reflection from the ranging signal emitted by the acoustic transducer, but also includes noise. Such noise originates from a variety of potential sources. Part of the noise is periodical with the measurement sequence and thus is repeatedly obtained as part of the response. This periodical noise may be electrical, acoustical, structural or processing noise. Examples of processing noise include auto-correlation noise (i.e. within a single channel, such as chirp and AM) and cross-correlation noise (between different measurement channels). One source of disturbing noise is noise due to ground reflections of the acoustic burst, i.e. reflections from the ground or soil or road on which the car stands or drives in which the sensor is incorporated. Such ground reflections tend to be received relatively shortly after the residual reverberations dies out. However, the moment of reception, the number of reflections, and the signal strength of ground reflections, each appears to depend on the type of ground. Furthermore, there may be real echo signals hidden between the ground reflections that should not be removed. A further source of disturbing noise is found to occur in systems employing data compression to convey sensor signals to the ECU for processing. This noise may be classified as compression noise and may again give rise to fake echoes, i.e. signals with a signal strength comparable or even larger than that of a signal representing an echo, but still being due to noise only.

Figure 4A:
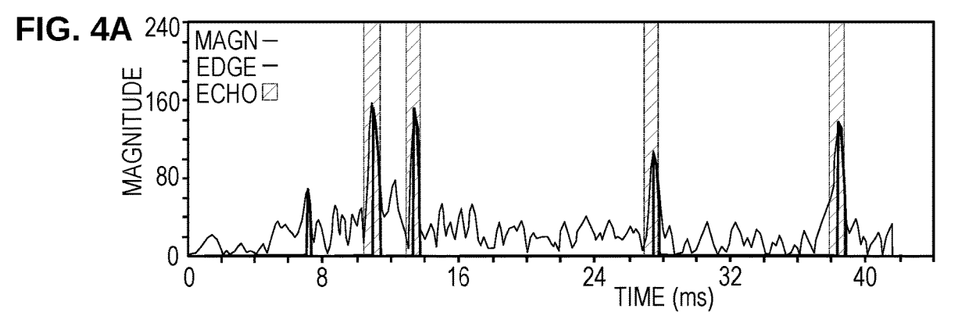
FIGS. 4A and 5A show graphs of illustrative signal curves for a reference technology.
Figure 5A:
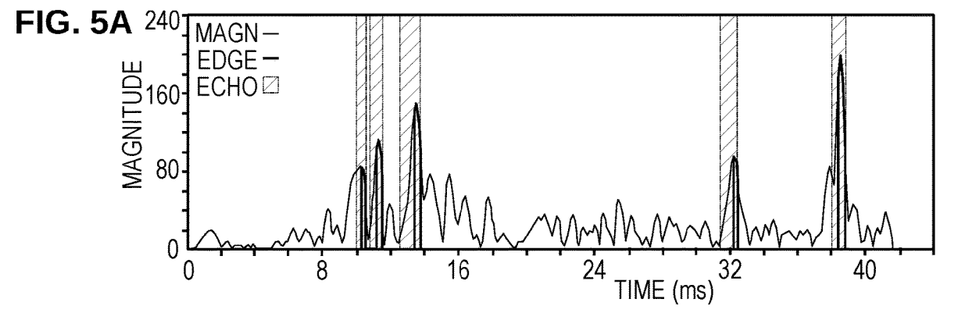

FIGS. 4A and 5A show two illustrative correlation magnitude curves ("MAGN") that have been processed as described in incorporated U.S. application Ser. No. 16/530, 654 ("Ultrasonic Sensor Having Edge-Based Echo Detection") to perform edge-based echo detection. More specifically, the processor(s) have processed the correlation magnitude to detect falling edges where the magnitude exceeds a CFAR threshold and the (negative) derivative exceeds a threshold values, yielding the curve labeled "EDGE". Where the falling edge is detected with a correlation magnitude above a time-dependent threshold, the processor(s) assert an echo detection signal ("ECHO"), to be transmitted as a pulsed output signal to an ECU or as otherwise encoded echo information.

The detected echoes in these figures include ground reflections (namely, the echoes detected before 16 milliseconds), which may be undesirable for most parking assistance systems. Of course it is possible for reflections from real obstacles to appear here too, so it is desirable to distinguish such reflections from ground reflections. Accordingly, there are provided herein improved methods for distinction of real echoes from fake echoes, as well as improved controllers with a processing circuit configured to perform such methods. The methods and corresponding controllers may be configured to provide signals indicative for the presence and/or type of ground reflections. Such signals may be provided in any suitable format from the controller to the ECU.

Figure 6:
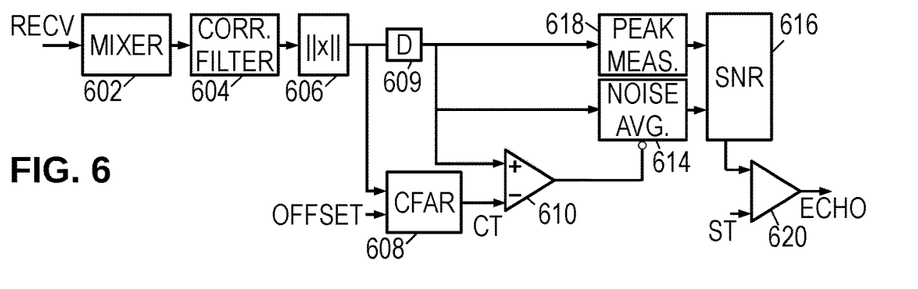
FIG. 6 is a block diagram of a first illustrative processing circuit.

FIG. 6 is a block diagram of a processing circuit according to a first embodiment of the present technology. FIGS. 7 to 10 show corresponding processing circuits according to further embodiments of the present technology. Equal reference numerals in these figures correspond to identical or corresponding parts. It is observed that the block diagrams are schematic in nature and simplified to omit features not immediately relevant for disclosing the present technology. For instance, the specific processing of the channels, such as chirp channels, is not specified herein. An example of a block diagram specifying processing of chirp channels is for instance disclosed in U.S. application Ser. No. 16/378,722, filed Apr. 9, 2019 and titled "Acoustic distance measuring circuit and method for low frequency modulation (LFM) chirp signals" by inventors Marek Hustava and Tomas Suchy, which is hereby incorporated herein by reference. A typical processing circuit may however include more functions, such as for instance elucidated in FIG. 4 and the corresponding description of U.S. application Ser. No. 16/724,783, filed Dec. 23, 2019 and titled "Piezoelectric transducer controller having model-based sideband balancing" by inventors Tomas Suchy, Jiri Kantor, and Marek Hustava, which is hereby incorporated herein by reference.

The illustrative block diagram of FIG. 6 shows a mixer 602 for downconverting the signal received from the piezoelectric transducer (RECV) to baseband, a correlation filter 604 that convolves the downconverted signal with the transmit pulse shape to produce a correlation signal. (Multiple filters or multiple sets of filter coefficients may be used to provide separate correlation signals for upper and lower sideband signals). A magnitude element 606 determines the absolute value of the correlation signal, or in some alternative embodiments, squares the correlation signal, yielding a correlation magnitude or energy signal that is supplied to various other elements for processing to detect peaks indicating reflections of transmit pulse energy (echoes) from obstacles.

A CFAR element 608 operates on the correlation magnitude or energy signal to provide a CFAR Threshold (CT) signal in accordance with a Constant False Alarm Rate (CFAR) algorithm. Various CFAR algorithms are described in the literature, including previously incorporated U.S. application Ser. No. 16/530,654, filed 2019 Aug. 2 and titled "Ultrasonic Sensor Having Edge-Based Echo Detection" by inventors M. Hustava and J. Kantor (citing U.S. Pat. No. 5,793,326 ("Hofele")). Suitable CFAR algorithm variations include for instance CASH-CFAR (Cell Averaging Statistic Hofele CFAR) and Ordered Statistic-CFAR (OS-CFAR). Briefly stated, the CFAR algorithms perform statistical processing within a moving window to determine a threshold value representing background "clutter", the processing operating to exclude from the threshold determination any strong peaks that would likely represent a valid echo. The CFAR variations vary in the precise nature of the statistical processing, e.g., whether using a min-max-sum, rank ordering, or averaging operations in combination with suitable weighting or scaling to enable adequate distinguishing between valid echoes and background noise. Various parameters of the algorithm (e.g., block size, window size) can be adjusted to optimize the adaptiveness of the threshold. A CFAR offset value may be stored in a memory and added to the algorithm-based threshold value to provide further tuning of the CT signal.

The CFAR element 608 may operate on a symmetric or asymmetric window around a "current" sample of the correlation magnitude signal. A delay element 609 may accordingly be used to provide a suitable time offset between the "early" correlation magnitude signal supplied to the CFAR element 608 and the "current" correlation magnitude signal supplied to the other elements of the processing circuit. A comparator 610 compares the current correlation magnitude signal to the CFAR threshold signal, asserting a selection signal for a noise averaging block 614 to indicate when the correlation magnitude signal is above the threshold (a "peak area"), and de-asserting the selection signal to indicate when the correlation magnitude signal is below the threshold (a "non-peak area"). The noise averaging block 614 receives the selection signal at an inverted enable (/EN) input, also known as a disable input, that disables operation of the noise averaging block 614 while the comparator output is asserted. In this fashion, averaging block operates on the non-peak areas of the signal and ignores the peak areas of the correlation magnitude signal.

In accordance with the present technology, the noise level is calculated in noise level calculator 614 on the basis of signals in the correlation magnitude signal outside a peak area only. Noise averaging block 614 calculates an average within a given portion or moving window of the non-peak correlation magnitude signal. As one example, a separate average is calculated for each portion of the magnitude signal. The length of the signal portion or moving window is suitably predefined and/or controllable, for instance under control of a microcontroller (ECU). The noise averaging block 614 may be provided with a clock signal so as to define the length of a magnitude signal portion. A length of a signal portion is for instance in one advantageous implementation 0.1-10 ms, or for instance 0.5-5 ms, such as 1-4 ms or 2.5-3.0 ms. The averaging block may for instance be configured to sum signals of the non-peak areas in the signal portion and divide it by the duration of the non-peak areas of the signal portion. While the present application refers to an average, it is to be understood that the resulting average may be any type of average as known to the person skilled in the art, including the median, the arithmetic average (mean), the mode, the geometric mean and/or a weighted average, and exponential rolling average.

For each peak in the current correlation magnitude signal, a peak measurement element 618 determines the signal strength by identifying the peak value (local maximum). A signal-to-noise ratio (SNR) block 616 accepts each peak value from peak measurement element 618 and uses a corresponding noise average value from noise averaging block to calculate a SNR value for that peak. We note here that block 616 is not limited to any definitional formula such as SNR=20 $\log_{10}$(signal/noise). In fact, given the hardware complexity typically associated with a logarithmic calculation, it may be preferred to use a simple ratio or other calculation that monotonically relates to the definitional formula in the region of interest. A comparator 620 compares the SNR value to a predetermined SNR threshold (ST) value, asserting an echo detection signal only when the SNR value for the peak exceeds the threshold. Though not shown here, the output of peak measurement element 618 may also be output from the sensor when the echo detection signal is asserted.

In the event that information concerning ground reflections is desired, such information may be obtained as the peak signals identified without assertion of the echo detection signal. Specific alternative implementations, including a separate comparator for the information concerning ground reflections, are not excluded.

Figure 7:
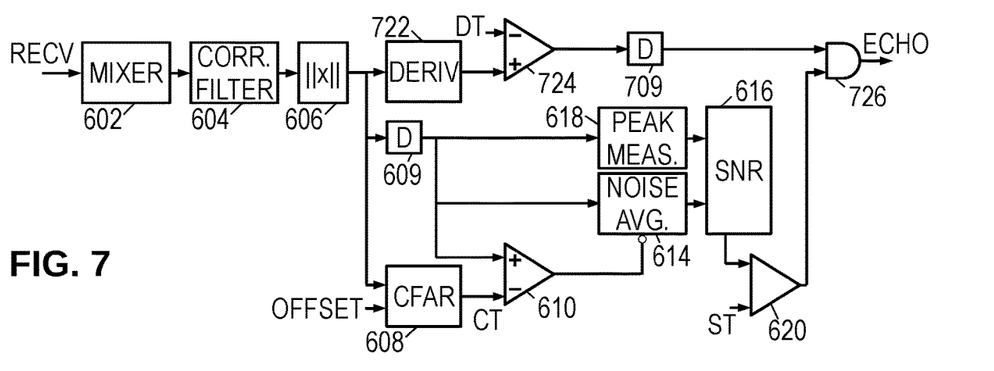
FIG. 7 is a block diagram of a second illustrative processing circuit.

FIG. 7 is a block diagram of a second embodiment of a processing circuit according to the present technology. This second embodiment differs from the first embodiment shown in FIG. 6, in that a further criterion is applied so as to exclude false echoes. The further criterion is based on evaluation of derivative signals from the correlated response. A derivation block 722 determines the time-derivative of the correlation magnitude signal. One potential implementation is described in, e.g., incorporated application Ser. No. 16/530,654 ("Ultrasonic sensor having edge-based echo detection"). A comparator 724 compares the derivative signal to a predetermined derivative threshold (DT) value. In the present example, the threshold is taken from memory, but it could alternatively be calculated on the basis of one or more values in the memory. The output signal is transmitted to a logical AND block 726, which asserts an echo detection signal only when the derivative exceeds DT and the peak SNR exceeds ST (indicated by the assertion of the output of comparator 620). A second delay element 709 is included within the derivative calculation path to provide a suitable time offset that accounts for the CFAR element delay and the SNR determination delay, so that the inputs to logical AND block 726 correspond to the same given sample of the correlation magnitude signal.

Hence, any pulsed output from the comparator 620 is only accepted if the derivative signal exceeds a threshold in comparator block 724. This second criterion is based on the observation that rising edges and/or falling edges of a valid echo peak are readily discernable, enabling the borders of an echo to be identified rather precisely. Thus, an echo start may be detected when the derivative signal raises above a predefined edge threshold. An echo end will be detected when the derivative signal falls below another predefined edge threshold. Hence, any signal with a peak level above a SNR ratio threshold but lacking a suitably-shaped correlation magnitude peak is still rejected. Although not shown in the one of the figures, it is not excluded that the rising and falling edges may be used so as to distinguish peak areas from other areas instead and/or in addition to the comparator 610.

Figure 8:
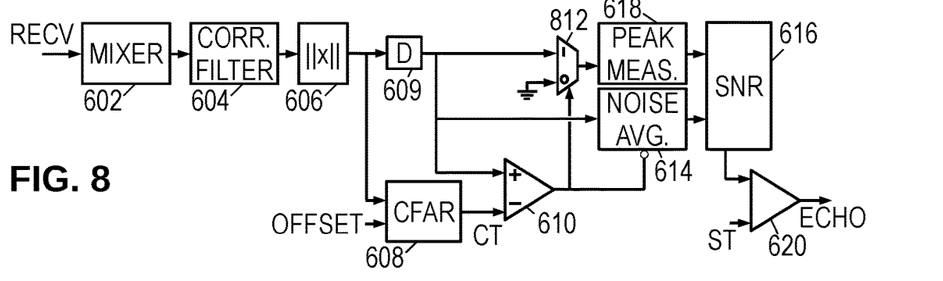
FIG. 8 is a block diagram of a third illustrative processing circuit.

FIG. 8 is a block diagram of a third embodiment of a processing circuit according to the present technology. It is similar to the embodiment of FIG. 6, but comparator 610 is further linked to a multiplexer 812 on the primary signal path to suppress non-peak portions of the correlation magnitude signal and pass only the peak portions of the correlation magnitude signal to the peak measurement block 618. The peak measurements provided by the peak measurement block 618, and correspondingly, the SNR measurements generated by block 616, are thus only for those peaks exceeding the CFAR threshold. As before, comparator 620 asserts an echo detection signal only when the calculated SNR exceed the SNR threshold.

Figure 9:
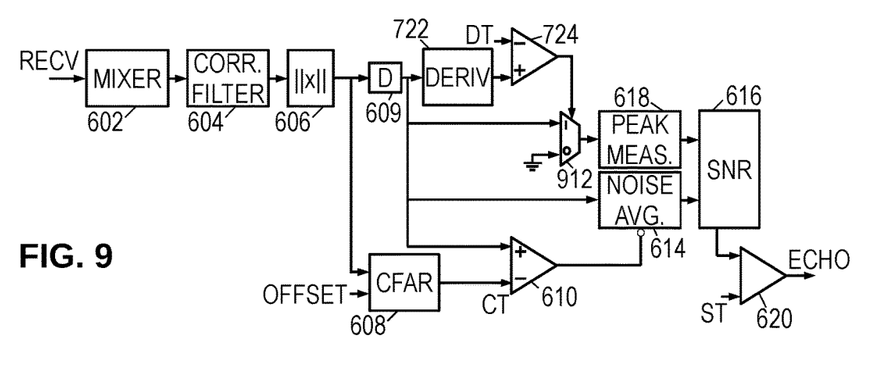
FIG. 9 is a block diagram of a fourth illustrative processing circuit.

FIG. 9 shows a block diagram of a fourth embodiment of a processing circuit according to the present technology. As with the previous embodiments, comparator 610 disables the noise averaging block 614 when the correlation magnitude signal exceeds the CFAR threshold. As with the embodiment of FIG. 7, a derivation block 722 determines the time derivative of the correlation magnitude signal, and comparator 724 detects when the (rising or falling) edge derivative exceeds a threshold. Rather than gating the output of comparator 620, however, the derivative comparator 724 controls primary path multiplexer 912 to pass the correlation magnitude signal only when the derivative criterion is satisfied and to suppress the correlation magnitude signal otherwise. It may be appropriate that the result of the comparator 724 is first converted into pulses, so as to specify the duration of the echo peak. The peak measurement block 618, and correspondingly the SNR calculation block 616, operate only on peaks having the requisite rising and/or falling edge definition. Comparator 620 asserts the echo detection signal when the calculated SNR value exceed the SNR threshold.

While FIGS. 7 and 9 indicate that a derivation is calculated in block 722 from a correlated magnitude signal, it is not excluded that a derivative signal is provided as a separate input, e.g., from a separate correlator or separate calculation thereof. Preferably, the derivative threshold used in comparator 724 is derived from a CFAR algorithm adapted to determine a suitable derivative threshold.

Figure 10:
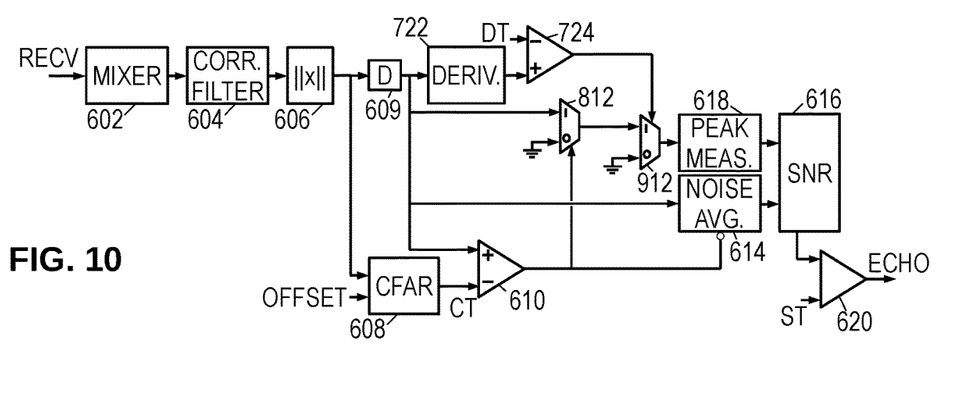
FIG. 10 is a block diagram of a fifth illustrative processing circuit.

FIG. 10 shows a fifth embodiment combining features of FIGS. 8 and 9. The primary signal path includes a multiplexer 812 controlled by comparator 810 to pass only peak areas of the signal, and further includes a multiplexer 912 controlled by derivative comparator 724 to pass only those peaks satisfying the derivative criterion. The peak measurement block 618, and thus SNR block 616, accordingly operate only on those peaks satisfying the CFAR and derivative criteria, and comparator 620 asserts the echo detection signal only when the SNR criterion is satisfied.

Figure 4B:
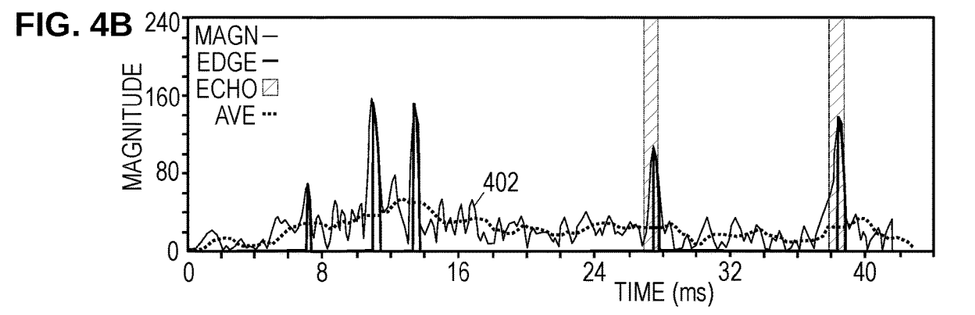
FIGS. 4B and 5B show graphs of illustrative signal curves for the present technology.
Figure 5B:
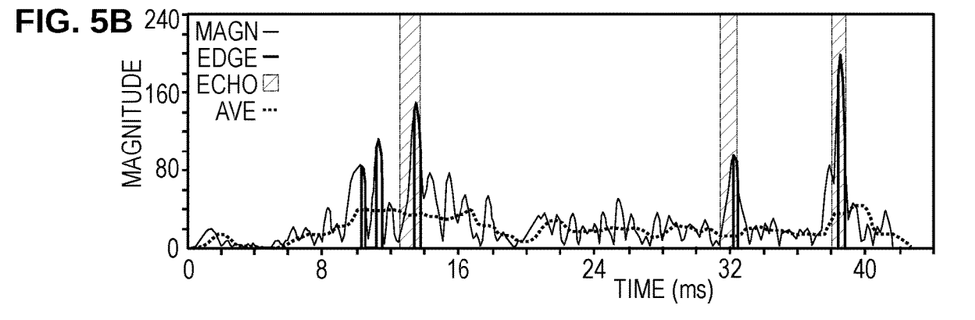

FIGS. 4B and 5B show echo detection results using the CFAR, derivative, and SNR criteria, indicating the suppression of (most) false echoes that were not suppressed in the reference technology. As such, sensing methods and controllers employing the SNR criterion provide a more reliable output. Furthermore, by reducing the number of false echoes, possibly to zero, the total number of detected echoes decreases, reducing the volume of data that may need to be transmitted from the sensor to the ECU over a limited bandwidth bus. The data volume reduction may advantageously reduce measurement delays, along with commensurate increases in measurement repetition time and latency. Such advantages may be magnified in higher bandwidth buses supporting multiple sensors.

It is further noted that the present technology advantageously screens false echoes that may be attributable to compression noise. More specifically, it is noted that some park assist sensing systems compress raw data, for instance Zero Intermediate Frequency (ZIF) IQ data, correlation magnitude data, and/or time-of-flight (ToF) data, for conveyance from the sensor controller to the microcontroller or ECU. The compression may lead to noise that some systems incorrectly interpret as echoes. The SNR criterion, optionally in combination with the CFAR and derivative criteria, enables the screening of such false echoes Note that the disclosed processing and processing circuitry can be implemented in the sensor controller, and that alternatively, at least some of the disclosed processing and processing circuitry may be implemented in the ECU or microcontroller that receives raw data from the sensor controller. Where the processing is implemented by the sensor controller, it is contemplated that the excluded peaks potentially indicative of ground reflections may nevertheless be at least intermittently conveyed to the ECU. Alternatively, the excluded peaks potentially representing ground reflections may be compared to stored reference signals and, if a suitable match is found, suitable signal indicating the presence and/or type of ground reflections may be conveyed to the ECU. Other data conveyed to the ECU may include data specifying the noise level, and/or data specifying locations of falling and rising edges such as obtained in the analysis by means of derivation based processing.

It is a further potential advantage of the present technology that the necessary size of memory on or linked to the controller may be reduced. The separate removal of ground reflections enables the CFAR algorithm to be performed with reduced memory buffering than what would otherwise be needed. The CFAR memory buffering depends at least partially on the number of echo peaks to be stored in said memory. It has been found that the number of echo peaks to be stored can be lower than 30, preferably lower than 25, or more preferably 20 or less or even 15 or less. Even with 10 stored echo peaks or less, acceptable results may be achieved.

Though the operations shown and described above are treated as being sequential for explanatory purposes, in practice the process may be carried out by multiple integrated circuit components operating concurrently and perhaps even speculatively to enable out-of-order operations. The sequential discussion is not meant to be limiting. Further, the foregoing description has presumed the use of an I/O line bus, but other bus embodiments including LIN, CAN and DSI3 are contemplated. These and numerous other modifications, equivalents, and alternatives, will become apparent to those skilled in the art once the above disclosure is fully appreciated. For example, correlated magnitude signal may be determined by squaring the correlation filter output or by dropping the sign bit of a binary number representation. It is intended that the following claims be interpreted to embrace all such modifications, equivalents, and alternatives where applicable.

While dependent claims are written down to refer back to a single claim as a matter of claim drafting prescriptions in certain countries, it is observed that any combination of a dependent claim with any of its preceding claims is foreseen by the present inventors and is deemed included in the full disclosure of the present application. Furthermore, it is to be understood that the dependent claims specified for one claim category apply also to another claim category, but have merely been omitted for the sake of limiting the overall number of claims and any claim fees that may be due as a result thereof.

The invention claimed is:

1. A controller for an acoustic transducer, the controller comprising:
    a transmitter to drive the acoustic transducer with a driving signal to generate acoustic bursts;
    a receiver to sense a response of the acoustic transducer to echoes of each acoustic burst;
    a processing circuit coupled to the transmitter and to the receiver, the processing circuit configured to convert said received response into output data by:
        correlating said response to said driving signal to obtain a correlated magnitude signal;
        distinguishing peak areas from non-peak areas in said correlated magnitude signal;
        deriving a noise level in a portion of said correlated magnitude signal based on the correlated magnitude signal in non-peak areas within said portion;
        calculating a signal to noise ratio (SNR) for a peak signal within the portion as a ratio of a peak value for the peak signal to the noise level in said portion of said correlated magnitude signal; and
        accepting the peak signal as an echo only if the SNR for said peak signal exceeds a predetermined threshold.

2. The controller as claimed in claim 1, wherein the processing circuit is further configured to:
    determine a derivative signal from the correlated magnitude signal;
    accept the peak signal as an echo only if the derivative signal corresponding to said peak signal exceeds a derivative threshold.

3. The controller as claimed in claim 2, wherein the derivative threshold is a CFAR threshold determined from a Continuous False Alarm Rate (CFAR) algorithm applied to the derivative signal.

4. The controller of as claimed in claim 2, further comprising a memory for storing the derivative threshold.

5. The controller as claimed in claim 1, wherein said distinguishing the peak areas from non-peak areas comprises calculating a CFAR threshold using a Continuous False Alarm Rate (CFAR) algorithm, and comparing the correlated magnitude signal with said CFAR threshold.

6. The controller as claimed in claim 5, wherein the processing circuit is further configured to: accept the peak signal as an echo only if the peak signal is within one of said peak areas.

7. The controller as claimed in claim 1, wherein the processing circuit further comprises a peak measurement element to detect said peak value.

8. The controller as claimed in claim 1, wherein the processing circuit is further configured to provide an output indicating a presence of a ground reflection.

9. The controller as claimed in claim 8, wherein the processing circuit is configured to generate said output indicative of ground reflections using the calculated SNR ratio.

10. A park assist control system, comprising a microcontroller, at least one a controller for an acoustic transducer, and a communication bus coupling the microcontroller and said at least one controller, the controller comprising:
   a transmitter to drive the acoustic transducer with a driving signal to generate acoustic bursts;
   a receiver to sense a response of the acoustic transducer to echoes of each acoustic burst;
   a processing circuit coupled to the receiver to convert said received response into output data; and
   an interface to convey said output data over the communication bus,
   wherein at least one of the processing circuit and the microcontroller is configured to:
      correlate said response with a pulse pattern to obtain a correlated response;
      distinguish peak areas from non-peak areas in said correlated response;
      derive a noise level in a portion of said correlated response using only the non-peak areas within said portion;
      calculate a signal to noise ratio (SNR) for a peak signal within the portion as a ratio of a peak value for the peak signal to said the noise level; and
      accept the peak signal as an echo only if the SNR for said peak signal exceeds a predetermined threshold.

11. The park assist control system as claimed in claim 10, wherein the processing circuit of the controller is configured to calculate said SNR ratio, and wherein the microcontroller is configured to process raw data transmitted via the communication bus from the controller.

12. The park assist control system of claim 11, wherein the raw data excludes the non-peak areas.

13. The park assist control system of claim 10, wherein the microcontroller is configured to distinguish peak areas from non-peak areas in the correlated response using a Continuous False Alarm Rate (CFAR) threshold.

14. The park assist control system of claim 13, wherein the microcontroller further determines a derivative signal from the correlated response, and accepts the peak signal as an echo only if the derivative signal corresponding to said peak signal exceeds a derivative threshold.

15. A method of operating a piezoelectric-based sensor, the method comprising:
   driving a piezoelectric transducer to generate a burst of acoustic energy;
   obtaining a response from the piezoelectric transducer;
   correlating said response relative to said driving signal to obtain a correlated response;
   distinguish peak areas from non-peak areas in said correlated response;
   deriving a noise level in a portion of said correlated response using only the non-peak areas within said portion;
   calculating a signal to noise ratio (SNR) for a peak signal within the portion as a ratio of a peak value of for the peak signal to the noise level; and
   accepting the peak signal as an echo only if the SNR for said peak signal exceeds a predetermined threshold.

16. The method of claim 15, further comprising:
   determining a derivative signal from the correlated response;
   accepting the peak signal as an echo only if the derivative signal corresponding to said peak signal exceeds a derivative threshold.

17. The method of claim 15, wherein said distinguishing the peak areas from non-peak areas comprises calculating a CFAR threshold using a Continuous False Alarm Rate (CFAR) algorithm, and comparing a magnitude of the correlated response with said CFAR threshold.

18. The method of claim 15, further comprising reporting the peak signal as a ground reflection if the SNR falls below the predetermined threshold.

19. A controller for an acoustic transducer, the controller comprising:
   a transmitter drive the acoustic transducer with a driving signal to generate acoustic bursts;
   a receiver to sense a response of the acoustic transducer to echoes of each acoustic burst;
   a processing circuit coupled to the transmitter and to the receiver, the processing circuit configured to convert said received response into output data by:
      correlating said response to said driving signal to obtain a correlated response;
      distinguishing peak areas from non-peak areas in said correlated response;
      using the non-peak areas in a portion of the correlated response to derive a noise level;
      calculating a signal to noise ratio (SNR) for a peak signal within the portion as a ratio of a peak value for the peak signal to the noise level; and
      identifying the peak signal as a ground reflection if the SNR falls below a predetermined threshold.

20. The controller of claim 19, wherein said distinguishing the peak areas from non-peak areas comprises calculating a CFAR threshold using a Continuous False Alarm Rate (CFAR) algorithm, and comparing a magnitude of the correlated response with said CFAR threshold.

* * * * *